United States Patent
Kim et al.

(10) Patent No.: US 12,366,448 B2
(45) Date of Patent: Jul. 22, 2025

(54) ELECTRONIC DEVICE AND METHOD FOR CORRECTING GEOMAGNETIC DATA

(71) Applicant: SAMSUNG ELECTRONICS CO., LTD., Suwon-si (KR)

(72) Inventors: Jinik Kim, Suwon-si (KR); Namjoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 252 days.

(21) Appl. No.: 18/091,893

(22) Filed: Dec. 30, 2022

(65) Prior Publication Data

US 2023/0138375 A1     May 4, 2023

Related U.S. Application Data

(63) Continuation of application No. PCT/KR2021/008375, filed on Jul. 1, 2021.

(30) Foreign Application Priority Data

Jul. 2, 2020 (KR) .................. 10-2020-0081629

(51) Int. Cl.
   *G06F 1/16*     (2006.01)
   *G01C 17/28*     (2006.01)
   *G01C 25/00*     (2006.01)

(52) U.S. Cl.
   CPC ........... *G01C 17/28* (2013.01); *G06F 1/1652* (2013.01); *G01C 25/00* (2013.01)

(58) Field of Classification Search
   CPC .................................................... G06F 1/1652
   See application file for complete search history.

(56) References Cited

U.S. PATENT DOCUMENTS 10,420,227 B2 *   9/2019   Lee ...................... G06F 1/1652
10,645,205 B2     5/2020   Lee
(Continued)

FOREIGN PATENT DOCUMENTS

CN     109587317 A     4/2019
CN     109712532 A     5/2019
(Continued)

OTHER PUBLICATIONS

Communication issued on Nov. 16, 2023 by the European Patent Office in corresponding European Application No. 21832505.8.
(Continued)

*Primary Examiner* — Adrian S Wilson
(74) *Attorney, Agent, or Firm* — Sughrue Mion, PLLC

(57) ABSTRACT

An electronic device includes a first housing, a second housing, a rollable display, a magnetic sensor, and a processor. The magnetic sensor is disposed at a first position in the second housing coupled with the first housing in a first state. The magnetic sensor is configured to move from a first position to a second position based on a movement of the second housing in the first state so that the first housing and the second housing are coupled in a second state and to move from the second position to the first position based on a switching from the second state to the first state. The processor is configured to: electrically connect to the magnetic sensor, obtain geomagnetic data based on a movement of the magnetic sensor, and obtain correction data based on the obtained geomagnetic data.

13 Claims, 18 Drawing Sheets

(56) References Cited

U.S. PATENT DOCUMENTS

| | | | |
|---|---|---|---|
| 10,652,376 B2* | 5/2020 | Yu | H04M 1/0216 |
| 10,747,269 B1 | 8/2020 | Choi et al. | |
| 11,194,363 B2 | 12/2021 | Kim et al. | |
| 11,348,201 B2* | 5/2022 | Jeong | G06F 3/04883 |
| 11,531,375 B2* | 12/2022 | Cho | H04M 1/0268 |
| 11,545,054 B2* | 1/2023 | Lee | G06F 3/147 |
| 12,066,866 B2* | 8/2024 | Park | G06F 1/1615 |
| 2005/0272487 A1 | 12/2005 | Lee | |
| 2005/0283988 A1 | 12/2005 | Sato et al. | |
| 2010/0190537 A1 | 7/2010 | Fujii | |
| 2013/0314762 A1 | 11/2013 | Kwack et al. | |
| 2014/0104166 A1 | 4/2014 | Kim | |
| 2014/0194165 A1* | 7/2014 | Hwang | G06F 3/147 |
| | | | 455/566 |
| 2014/0200841 A1 | 7/2014 | Choi et al. | |
| 2016/0139633 A1* | 5/2016 | Lee | G06F 1/1652 |
| | | | 345/33 |
| 2017/0023978 A1* | 1/2017 | Cho | G06F 1/1652 |
| 2017/0140504 A1* | 5/2017 | Jeong | G06F 1/1677 |
| 2017/0212607 A1 | 6/2017 | Yoon | |
| 2019/0155476 A1* | 5/2019 | Kim | G09G 3/2092 |
| 2019/0227599 A1* | 7/2019 | Kwak | G09G 5/003 |
| 2019/0364676 A1* | 11/2019 | Lee | G06F 1/1652 |
| 2019/0369670 A1* | 12/2019 | Cho | G06F 1/1656 |
| 2019/0384438 A1 | 12/2019 | Park et al. | |
| 2020/0363841 A1 | 11/2020 | Kim et al. | |
| 2022/0291718 A1* | 9/2022 | Park | G06F 3/04886 |

FOREIGN PATENT DOCUMENTS

| | | |
|---|---|---|
| EP | 1605232 A2 | 12/2005 |
| JP | 2009-33590 A | 2/2009 |
| JP | 2013-225931 A | 10/2013 |
| KR | 10-0616544 B1 | 8/2006 |
| KR | 10-0686459 B1 | 2/2007 |
| KR | 10-2008-0076892 A | 8/2008 |
| KR | 10-2008-0095447 A | 10/2008 |
| KR | 10-1013288 B1 | 2/2011 |
| KR | 10-2013-0140408 A | 12/2013 |
| KR | 10-2017-0089664 A | 8/2017 |
| KR | 10-1903742 B1 | 10/2018 |
| KR | 10-2019-0062855 A | 6/2019 |
| KR | 10-2019-0108004 A | 9/2019 |
| KR | 10-2029823 B1 | 10/2019 |
| KR | 10-2019-0141518 A | 12/2019 |

OTHER PUBLICATIONS

International Search Report (PCT/ISA/210) dated Oct. 13, 2021 issued by the International Searching Authority in International Application No. PCT/KR2021/008375.

Written Opinion (PCT/ISA/237) dated Oct. 13, 2021 issued by the International Searching Authority in International Application No. PCT/KR2021/008375.

Office Action dated Sep. 23, 2024, issued by Korean Patent Office in Korean Patent Application No. 10-2020-0081629.

* cited by examiner (A)

(B)

(A)

(B)

ELECTRONIC DEVICE AND METHOD FOR CORRECTING GEOMAGNETIC DATA

CROSS-REFERENCE TO RELATED APPLICATIONS

This application is a by-pass continuation application of International Application No. PCT/KR2021/008375, filed on Jul. 1, 2021, which based on and claims priority to Korean Patent Application No. 10-2020-0081629, filed on Jul. 2, 2020, in the Korean Intellectual Property Office, the disclosures of which are incorporated by reference herein in their entireties.

BACKGROUND

1. Field

The disclosure relates to an electronic device and a method for improving accuracy of data through correction of a magnetic sensor.

2. Description of Related Art

Recently, in line with a significant increase in processing performance of electronic devices such as smartphones, large-area displays are preferred in order to effectively provide various functions. In addition, miniaturization of electronic devices is also required to improve portability.

In response to these demands, an electronic device employing a rollable display is able to provide both a wide screen and portability. When a portion of the display is rolled into the electronic device such that the display is reduced, it is possible to secure portability and provide a wide screen when the display is expanded.

Recent electronic devices are often equipped with a geomagnetic sensor for providing azimuth information. However, the accuracy of the geomagnetic sensor may be lowered depending on the surrounding environment, so a calibration of the geomagnetic sensor is required to obtain accurate azimuth information. For example, an application that mainly uses the geomagnetic sensor may provide a User Interface (UI) requesting the user to move the device in a circle or figure eight shape, thereby perform calibration.

Assuming a scenario in which a user utilizes a geomagnetic sensor in a rollable electronic device, the user must extend the rollable electronic device and then perform an operation to move the rollable electronic device in a circle or in a figure eight (8). However, since the extended electronic device has a large size, it is not convenient for the user to move the electronic device, and the user is likely to drop the electronic device, causing a risk of falling or damage.

Although existing electronic devices are capable of using geomagnetic data in two operations of executing an app and correcting sensor data, a rollable electronic device may require three operations such as executing an app, expanding a device, and correcting sensor data.

SUMMARY

According to an aspect of the disclosure, an electronic device includes: a housing having a first housing and a second housing coupled to the first housing to be movable relative to the first housing; a roller part; a drive part connected to the roller part; a rollable display having (i) a first part disposed adjacent to the second housing, and (ii) a second part surrounding the roller part and having a portion disposed inside the electronic device; a magnetic sensor disposed at a position corresponding to the second part; and at least one processor configured to electrically connect to the magnetic sensor. The magnetic sensor is disposed at a first position in the second housing coupled with the first housing in a first state. The magnetic sensor is configured to move from the first position to a second position based on a movement of the second housing in the first state relative to the first housing so that the first housing and the second housing are coupled in a second state. The magnetic sensor is configured to move from the second position to the first position based on a switching from the second state to the first state. The at least one processor is further configured to: obtain geomagnetic data based on a movement of the magnetic sensor; and obtain correction data based on the obtained geomagnetic data.

According to another aspect of the disclosure, a method of correcting geomagnetic data of an electronic device having a rollable display and a magnetic sensor, includes: arranging the magnetic sensor at a first position in a second housing coupled with a first housing, the magnetic sensor being movable from the first position to a second position; obtaining geomagnetic data from the magnetic sensor based on a movement of the second housing relative to the first housing, the movement of the second housing changing an area where the rollable display is exposed to the outside of the electronic device; and obtaining correction data based on the obtained geomagnetic data.

According to one or more embodiments of the disclosure, in an electronic device having a rollable structure, a change in the coupling structure of the device may be detected, and one or more movements occurring at this time may be used to calibrate a geomagnetic sensor to correct geomagnetic sensor data when switching between the coupling structures, thereby improving accuracy.

In addition, it is possible to provide corrected geomagnetic data according to a user's request without additional operations of the user. Effects obtained from one or more embodiments of the disclosure are not limited to the above-mentioned effects, and other effects not mentioned above will be clearly understood by those of ordinary skill in the art to which the disclosure belongs from the description below.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
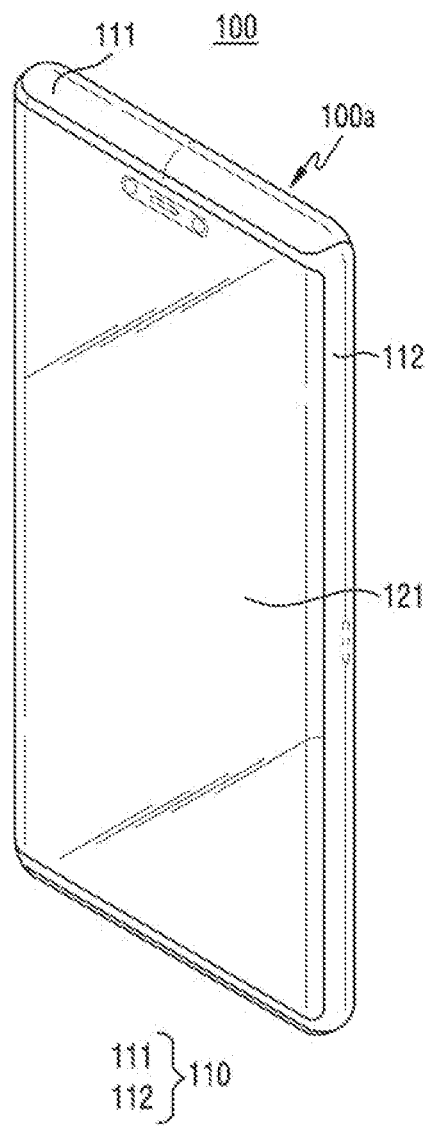
FIG. 1A is a perspective view illustrating an electronic device in a first state according to an embodiment.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part, adapted to perform one or more functions. For example, according to an embodiment, the module may be implemented in a form of an application-specific integrated circuit (ASIC).

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 1B:
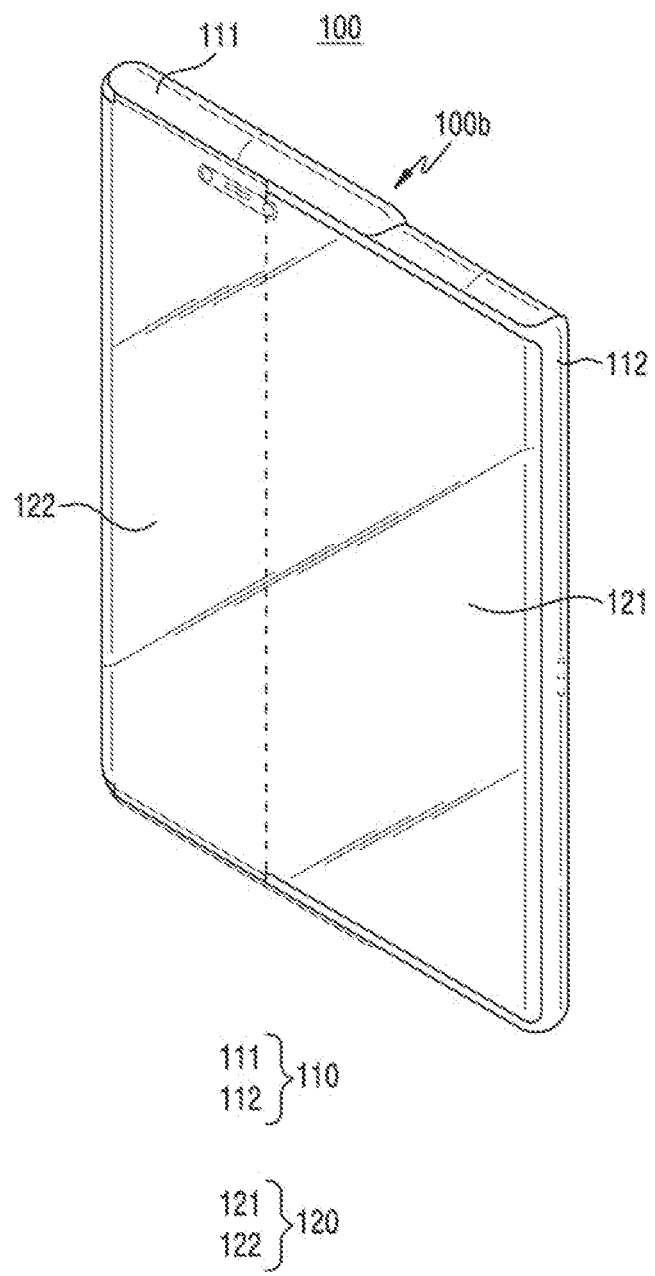
FIG. 1B is a perspective view illustrating an electronic device in a second state according to an embodiment.

FIG. 1A is a front perspective view of an electronic device in a first state according to an embodiment. FIG. 1B is a front perspective view of an electronic device in a second state according to an embodiment.

Referring to FIGS. 1A and 1B, the electronic device 100 according to an embodiment may have a display 120 positioned on one surface. Hereinafter, the surface on which the display 120 is positioned will be referred to as a 'front surface.' According to an embodiment, the display 120 may occupy most of the front surface of the electronic device 100. According to an embodiment, the display 120 may include a flat shape and a curved shape. The display 120 and the housing 110 surrounding at least a portion of an edge of the display 120 may be disposed on the front surface of the electronic device 100. According to an embodiment, the housing 110 may form a partial area of the front surface, a side surface, and a rear surface of the electronic device 100. According to another embodiment, the housing 110 may form a partial area of a side surface and a rear surface of the electronic device 100. According to an embodiment, the housing 110 may include a first housing 111 and a second housing 112 that is movable relative to the first housing 111.

According to an embodiment, the display 120 may include a first part 121 that may be coupled to the second housing 112, and a second part 122 that extends from the first part 121 and may be received inside the electronic device 100. According to an embodiment, if the electronic device 100 switches from the first state 100*a* to the second state 100*b* according to the movement of the second housing 112, the second part 122 of the display 120 may be drawn out of the electronic device 100. According to an embodiment, if the electronic device 100 switches from the second state 100*b* to the first state 100*a* according to the movement of the second housing 112, the second part 122 of the display 120 may be received inside the electronic device 100.

Figure 2A:
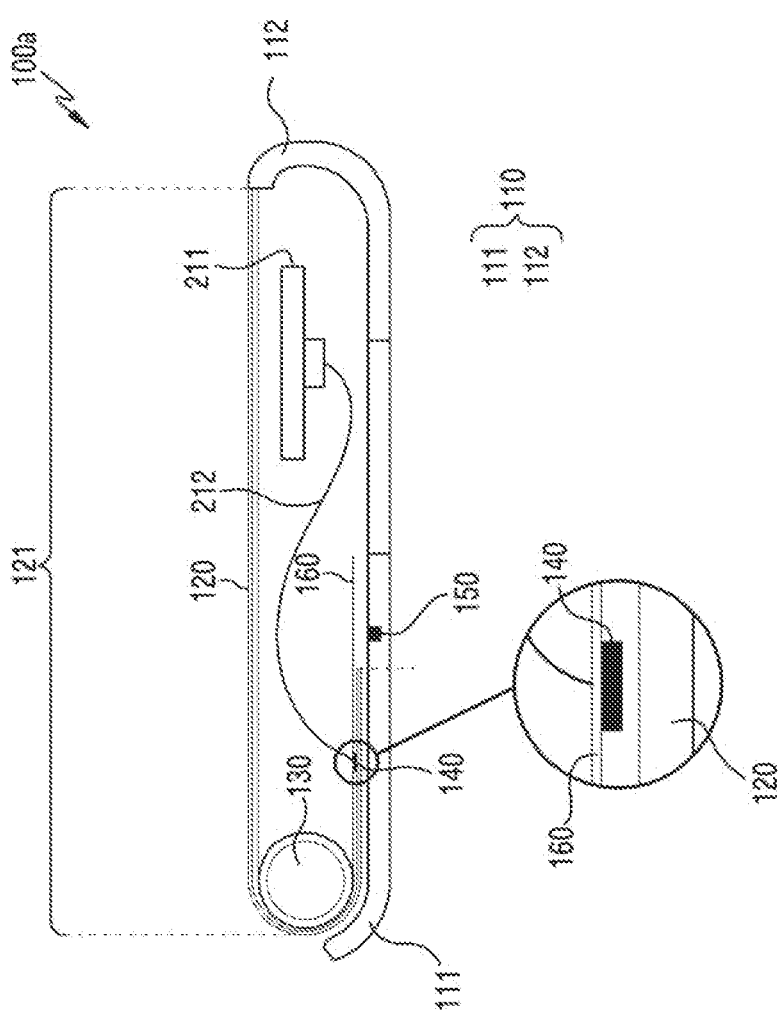
FIG. 2A is a cross-section view of an electronic device in a first state according to an embodiment.
Figure 2B:
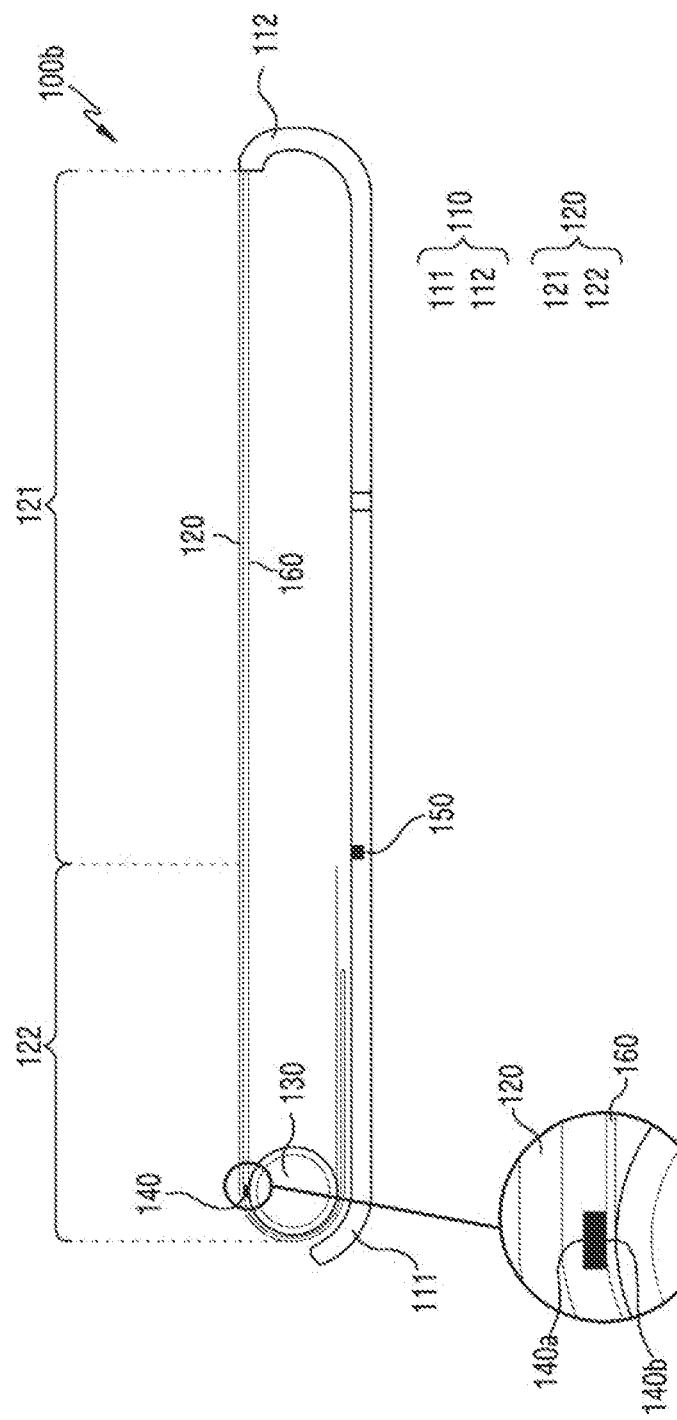
FIG. 2B is a cross-section view of an electronic device in a second state according to an embodiment.

FIG. 2A is a cross-section view of an electronic device in a first state according to an embodiment. FIG. 2B is a cross-section view of an electronic device in a second state according to an embodiment.

Referring to FIGS. 2A and 2B, an electronic device 100 according to an embodiment may include a display 120, a first housing 111, a second housing 112, a roller part 130, a rolling rail 160, a magnetic sensor 140, a Printed Circuit Board (PCB) 211, a Flexible PCB (FPCB) 212, and a structure detection sensor 150. The elements of the electronic device 100 illustrated in FIGS. 2A and 2B are only examples for convenience of description, and other elements may be added thereto, or at least some of the illustrated elements may be excluded or modified.

Referring to FIGS. 2A and 2B, the display 120 may be disposed on the front surface of the electronic device 100 according to an embodiment. According to an embodiment, the roller part 130 may be disposed inside the electronic device 100. According to an embodiment, the rolling rail 160 may be coupled to the display 120. The rolling rail 160 may be disposed to surround the roller part 130. According to an embodiment, the rolling rail 160 may move along with the display 120 while surrounding the roller part 130 according to the movement of the second housing 112.

According to an embodiment, the roller part 130 may include elements capable of providing rotational motion. For example, it may include a shaft configuring a rotation shaft and a gear structure.

According to an embodiment, if the electronic device 100 switches from the first state 100*a* to the second state 100*b*, the second part 122 of the display 120 may be exposed to the outside of the electronic device 100 according to the movement of the rolling rail 160. According to another embodiment, if the electronic device 100 switches from the second state 100*b* to the first state 100*a*, the second part 122 of the display 120 may be received inside the electronic device 100 while surrounding the roller part 130 according to the movement of the rolling rail 160.

The magnetic sensor 140 according to an embodiment may include, but is not limited to, a geomagnetic sensor, the Hall sensor, and a compass sensor.

According to an embodiment, the magnetic sensor 140 may be disposed adjacent to the display 120 on the rolling rail 160. According to another embodiment, the magnetic sensor 140 may be disposed on one surface adjacent to the rolling rail 160 of the display 120. According to an embodiment, the magnetic sensor 140 may be disposed inside the rolling rail 160 so as to be adjacent to the display 120. According to another embodiment, the magnetic sensor 140 may be disposed inside the rolling rail 160 so as to be adjacent to the roller part 130. According to an embodiment, a printed circuit board 211 may be disposed in the electronic device 100. For example, the magnetic sensor 140 may be disposed on the printed circuit board 211 or may be electrically connected to the printed circuit board 211. According to an embodiment, the magnetic sensor 140 may be electrically connected to the printed circuit board 211 and the FPCB 212.

In an embodiment, as the state of the electronic device 100 changes, the magnetic sensor 140 may move around the roller part 130 together with the display 120. For example, the magnetic sensor 140 may be disposed adjacent to the rear surface of the electronic device 100 in the first state 100*a* but may be disposed adjacent to the front surface of the electronic device 100 in the second state 100*b*. In an embodiment, the magnetic sensor 140 may be turned upside down when moving around the roller part 130. For example, the upper surface 140*a* (e.g., the surface facing the display 120) of the magnetic sensor 140 may face the rear surface of the electronic device 100 in the first state 100*a* and face the front surface of the electronic device 100 in the second state 100*b*. According to an embodiment, as the display screen of the electronic device 100 expands, the magnetic sensor 140 may move relative to the electronic device 100 along a straight path having a first length, and move along a curved path around the roller part 130, and then move along a straight path having a second length. Here, if it is assumed that the magnetic sensor moves in a first direction when moving the first length, the magnetic sensor may move in the opposite direction of the first direction when moving the second length. Alternatively or in addition, the first length may be the same as or different from the second length depending on design.

According to another embodiment, as the state of the electronic device 100 changes, the magnetic sensor 140 may move in the direction of movement of the second housing 112 in the area corresponding to the second part 122 of the display 120 of the electronic device 100.

According to an embodiment, the structure detection sensor 150 may be disposed in a part of the housing 110 or inside the housing 110 to detect a change in the structure of the housing 110. The structure detection sensor 150 may include, for example, at least one of the Hall sensor and a distance sensor, but is not limited thereto. For example, it may include at least one of an optical distance sensor, an ultrasonic distance sensor, and a radio wave distance sensor capable of detecting the state of the housing 110 or the movement distance of the housing 110.

According to an embodiment, if the electronic device 100 switches from the first state 100*a* to the second state 100*b* or from the second state 100*b* to the first state 100*a*, the structure detection sensor 150 may detect a change in the state of the electronic device 100. For example, the structure detection sensor 150 may detect that a state change is started, that a state change is in progress, or that a state change is completed. For example, the Hall sensor may be a magnetic sensor and may be disposed in a part of the housing 110 or inside the housing 110 to detect a change in magnetism according to the movement of the housing 110, thereby detecting a change in the state of the housing 110. The disposition of the structure detection sensor 150 is not limited to the inside or part of the housing, and it may be disposed inside the electronic device 100. According to an embodiment, it is possible to measure a distance between a first point of the first housing 111 and a second point of the second housing 112, thereby detecting a change in state of the electronic device 100 according to a change in the distance. For example, a distance sensor may measure distance by emitting light or radio waves and using the time it takes for the light or radio waves to be reflected from other objects and come back. For example, the distance sensor may include a Time-Of-Flight (TOF) sensor that is an optical distance sensor. The TOF sensor may further include a light-emitting unit and measure the time it takes for the light emitted from the light-emitting unit to be reflected from other objects and come back, thereby measuring a distance. For example, the light-emitting unit of the TOF sensor may be disposed in a part of the housing 110 or inside the housing 110 to be spaced apart from the TOF sensor.

According to an embodiment, the structure detection sensor 150 may be disposed on a printed circuit board disposed inside the housing 110 or may be electrically connected to the printed circuit board. However, those skilled in the art will readily understand that disposition of the structure detection sensor 150 is not limited and that any disposition capable of detecting the state change, according to one or more embodiments of the disclosure, may be applied.

Figure 3A:
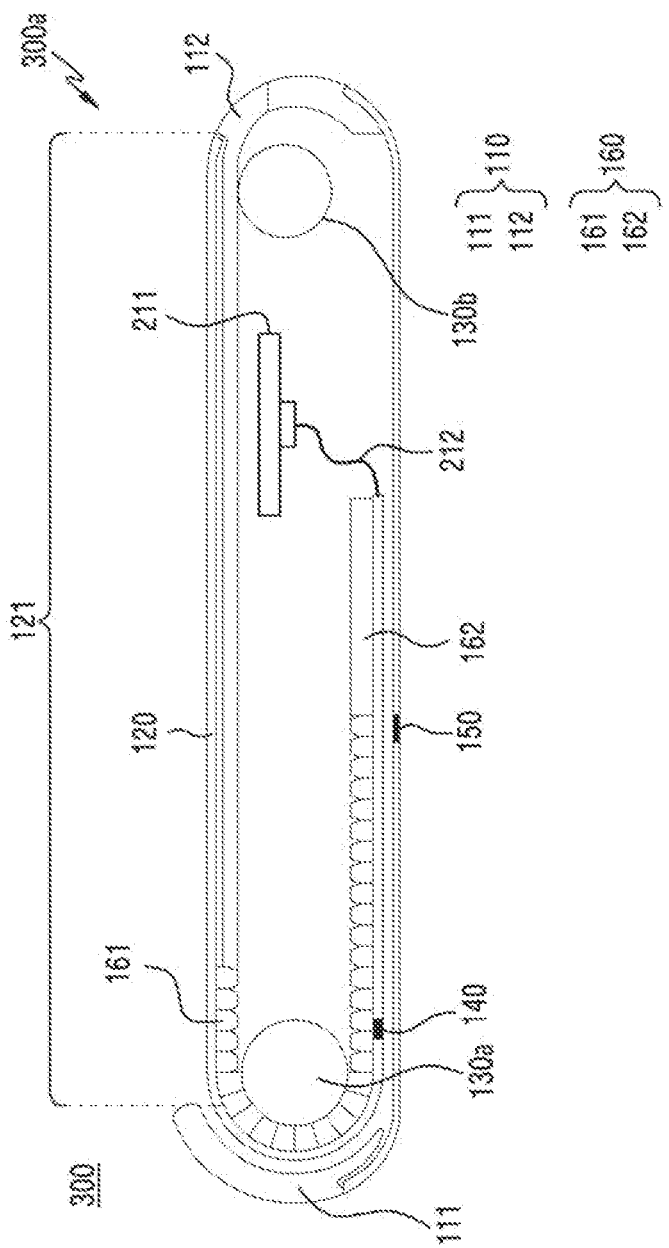
FIG. 3A is a cross-section view of an electronic device including a plurality of joint structures in a first state according to an embodiment.
Figure 3B:
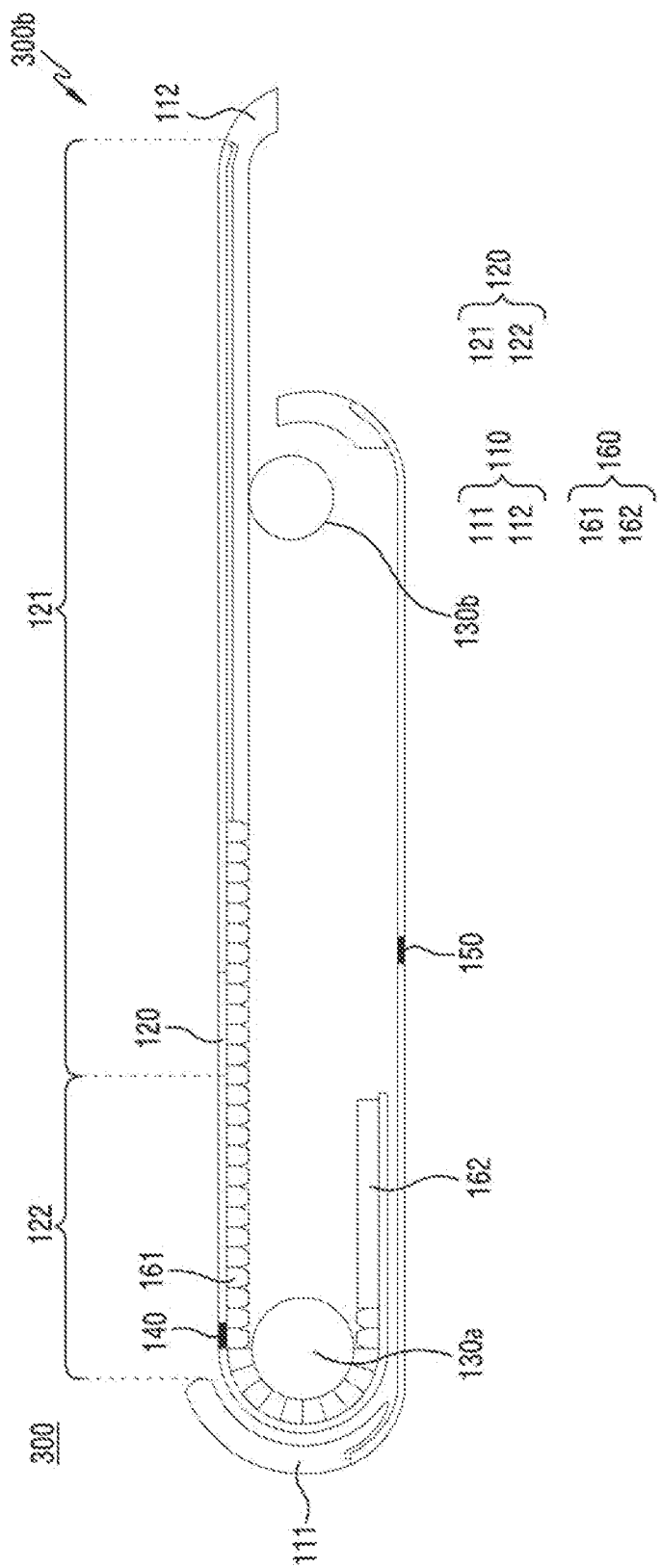
FIG. 3B is a cross-section view of an electronic device including a plurality of joint structures in a second state according to an embodiment.

FIG. 3A is a cross-section view of an electronic device including a plurality of joint structures in a first state according to an embodiment. FIG. 3B is a cross-section view of an electronic device including a plurality of joint structures in a second state according to an embodiment.

FIGS. 3A and 3B are cross-sectional views of the electronic device 300 in which some configurations of the electronic device 300 are omitted in order to explain the movement of the housing 110 in the first state 300a and the second state 300b.

Referring to FIGS. 3A and 3B, an electronic device 300 according to an embodiment may include a display 120, a first housing 111, a second housing 112, a roller part 130, a rolling rail 160, a magnetic sensor 140, and/or a structure detection sensor 150. According to an embodiment, the electronic device 300 may include at least one spring inside the electronic device 300. According to another embodiment, at least one (e.g., at least one spring) of the above-described elements of the electronic device 300 may be omitted or other elements may be added thereto. The same reference numerals will be used for the same or the substantially same elements as those described above, and redundant descriptions will be omitted.

According to an embodiment, the first housing 111 may form at least a portion of a side surface and/or a rear surface of the electronic device 300. According to an embodiment, the second housing 112 may form at least a portion of a front surface and/or a side surface of the electronic device 300. According to an embodiment, the display 120 may be coupled to at least a portion of the second housing 112.

According to an embodiment, a partial area of the display 120 may be disposed to overlap the second housing 112. For example, at least a partial area of one surface of the display 120 may be disposed to come into contact with at least a partial area of the front surface of the second housing 112, and the opposite surface of the second housing 112 may be disposed to be exposed to the outside.

According to an embodiment, the rolling rail 160 may include a plurality of joint structures 161 and a support plate 162. In an example, a partial area of the plurality of joint structures 161 may be deformed in its shape while the state (e.g., the first state 300a or the second state 300b) of the electronic device 300 switches. For example, a partial area of the plurality of joint structures 161 may be bent to have a specified curvature or unfolded when the electronic device 300 switches from the first state 300a to the second state 300b or from the second state 300b to the first state 300a. According to another embodiment, the second housing 112 may be fixed or coupled to one end of the plurality of joint structures 161, and a portion of the first part 121 of the display 120 may be disposed at the upper end of the second housing 112. In another example, the support plate 162 may be fixed or coupled to one end of the plurality of joint structures 161.

According to an embodiment, the roller part 130 may include a first roller 130a and/or a second roller 130b disposed to be spaced apart from the first roller 130a. For example, the second housing 112 of the display 120 may be coupled to one end of the second roller 130b. Accordingly, the above-described second roller 130b may serve to maintain the flatness of the display 120 when the electronic device 300 switches from the second state 300b to the first state 300a or from the first state 300a to the second state 300b. According to an embodiment, the first roller 130a may include elements (e.g., a rotation shaft and a gear) that provides rotational motion. Additionally, the first roller 130a may further include a motor connected to at least one (e.g., a rotation shaft) of the elements.

According to an embodiment, the first roller 130a may come into contact with the plurality of joint structures 161 of the rolling rail 160, and the rolling rail 160 may move within a specified range by rotation of the first roller 130a. For example, if the first roller 130a rotates clockwise while the electronic device 300 is switching from the first state 300a to the second state 300b, a partial area of the plurality of joint structures 161, which is in the bent state, may become flat so that the rolling rail 160 may move in a first direction (e.g., a direction away from the first roller 130a). As another example, if the first roller 130a rotates counter-clockwise while the electronic device 300 is switching from the second state 300b to the first state 300a, a partial area of the plurality of joint structures 161, which is in the flat state, may be bent so that the rolling rail 160 may move in a second direction (e.g., the opposite direction of the first direction). According to an embodiment, as the shape of the partial area of the plurality of joint structures 161 is deformed when the state of the electronic device 300 switches, the shape of the second part 122 of the display 120, supported by the plurality of joint structures 161, may also be deformed to correspond to the shape of the plurality of joint structures 161.

According to an embodiment, the display 120 may be disposed on the outer circumferential surface of the rolling rail 160, and the above-described display 120 may move together with the rolling rail 160 by the rotation of the first roller 130a. According to an embodiment, the display 120 may include a first part 121 and/or a second part 122 whose shape may be deformed according to the state of the electronic device 300.

According to an embodiment, the first part 121 of the display 120 may be located at the upper end of the second housing 112 of the rolling rail 160 and/or the partial area of the plurality of joint structures 161 to be supported by the second housing 112 and/or the plurality of joint structures 161. In an example, the first part 121 of the display 120 may be exposed to the outside of the electronic device 300 regardless of the state of the electronic device 300 (e.g., the first state 300a or the second state 300b).

According to an embodiment, the second part 122 of the display 120 may be located at the upper end of the partial area of the plurality of joint structures 161 of the rolling rail 160 to be supported by the plurality of joint structures 161. In an example, the second part 122 of the display 120 may be selectively exposed to the outside of the electronic device 300 depending on the state of the electronic device 300.

For example, when the electronic device 300 is in the first state 300a, the second part 122 of the display 120 may be received in the inner space of the electronic device 300 while being wound around the plurality of joint structures 161, and as a result, the second part 122 may not be exposed to the outside of the electronic device 300. As another example, if the electronic device 300 switches from the first state 300*a* to the second state 300*b*, the area of the second part 122 of the display 120, which is adjacent to the first part 121, may be drawn out of the electronic device 300. As the partial area of the second part 122 adjacent to the first part 121 is drawn out of the electronic device 300, the area of the display 120 exposed to the outside of the electronic device 300 may be expanded. As another example, if the electronic device 300 switches from the second state 300*b* to the first state 300*a*, the area of the second part 122 exposed to the outside of the electronic device 300, which is adjacent to the support plate 162, may be received inside the electronic device 300. As the partial area of the second part 122 adjacent to the support plate 162 is received inside the electronic device 300, the area of the display 120 exposed to the outside of the electronic device 300 may be reduced.

The electronic device 300 according to one or more embodiments is not limited to the configuration illustrated in FIGS. 2A to 3B. For example, the display 120 may be disposed to surround most of the front surface and a part of the rear surface of the electronic device 300, so that the partial area of the display 120 may be exposed to the outside through the rear surface of the electronic device 300 even in the first state 300*a*.

Figure 4:
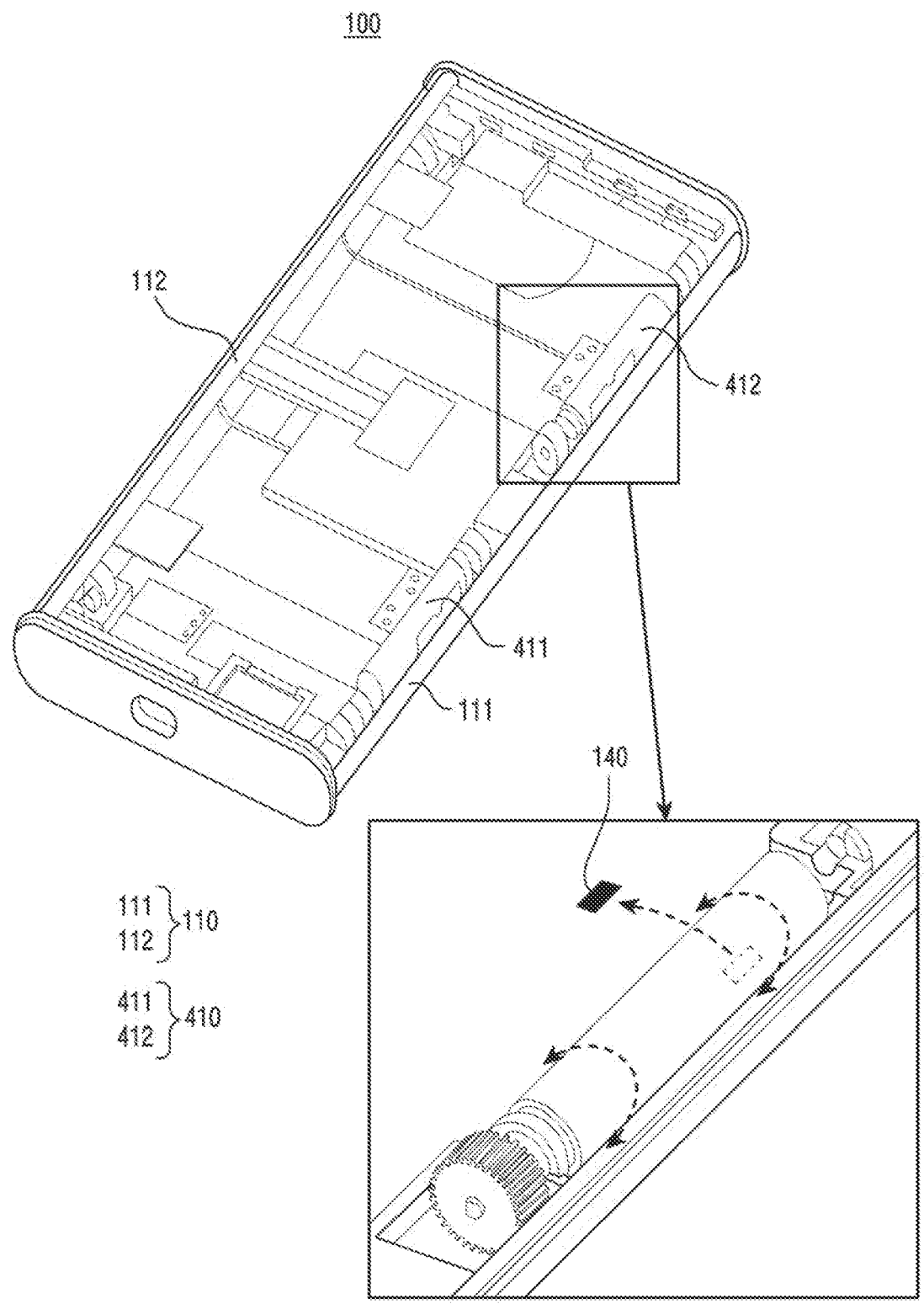
FIG. 4 illustrates a drive part configured as a motor in an electronic device according to an embodiment.

FIG. 4 illustrates a drive part configured as a motor in an electronic device according to an embodiment.

Referring to FIGS. 2A, 2B, and 4 together, in an embodiment, the drive part 190 of the electronic device 100 may include a motor 410. According to an embodiment, the motor 410 may be disposed inside the roller part 130. According to another embodiment, the motor 410 may be disposed at one end of the roller part 130, so the motor 410 is coupled to the roller part 130.

According to an embodiment, the motor 410 may include a first motor 411 and a second motor 412. According to an embodiment, the first motor 411 and the second motor 412 may be the same as or similar to each other. According to an embodiment, at least one processor 170 (e.g., the processor 1320 in FIG. 13) may generate an electrical signal to drive the first motor 411 and/or the second motor 412 to rotate. As the roller part 130 rotates according to the rotation of the first motor 411 and/or the second motor 412, the state of the electronic device 100 may switch from the first state 100*a* to the second state 100*b* or switch from the second state 100*b* to the first state 100*a*. According to an embodiment, the magnetic sensor 140 may rotate along the surface of the roller part 130 together with the display 120 and the rolling rail 160.

Figure 5:
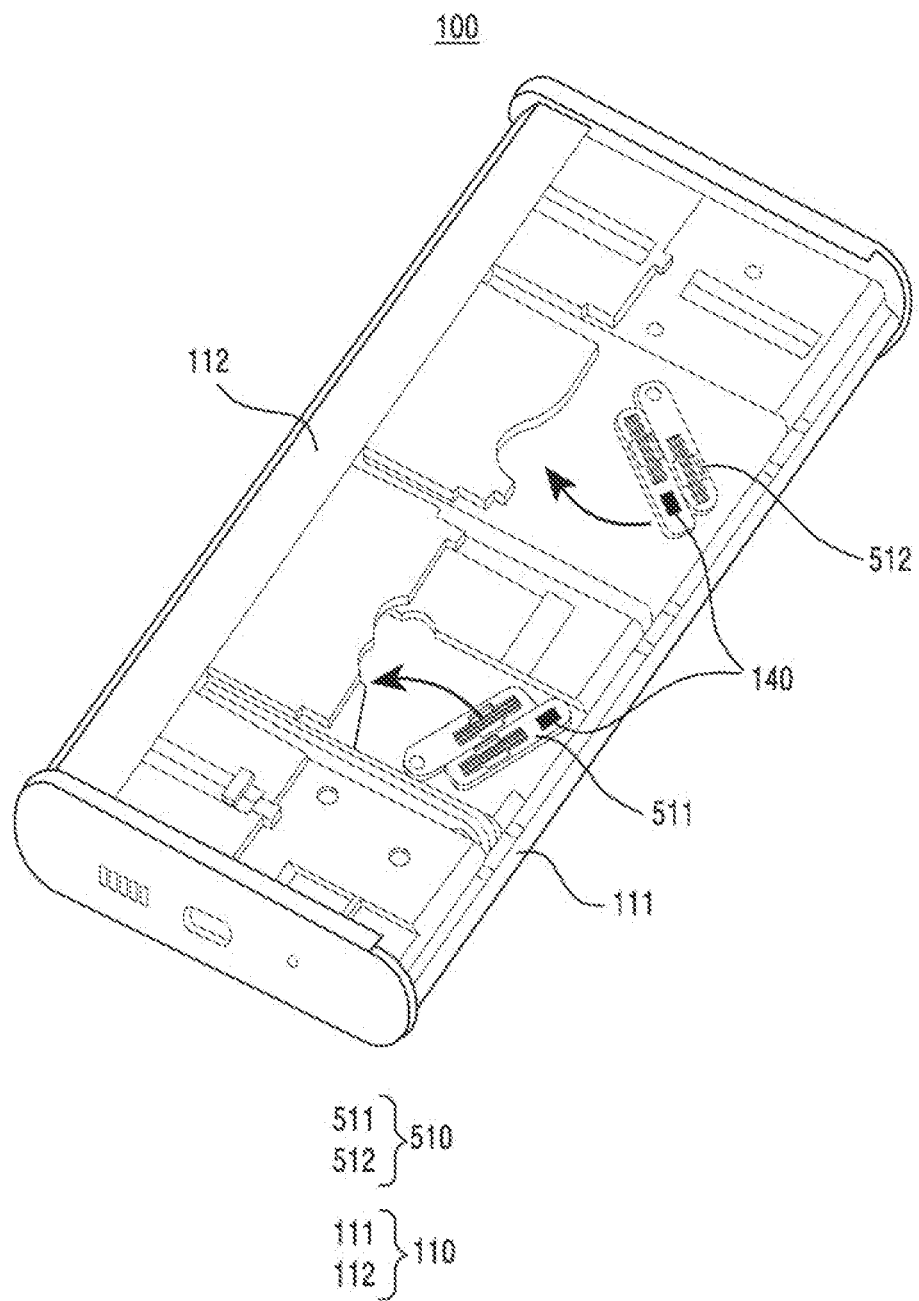
FIG. 5 illustrates a drive part configured as a spring in an electronic device according to an embodiment.

FIG. 5 illustrates a drive part configured as a spring in an electronic device according to an embodiment.

Referring to FIGS. 2A, 2B, 4, and 5 together, in an embodiment, the drive part 190 of the electronic device 100 may include a spring 510. According to an embodiment, each of the first spring 511 and the second spring 512 may include at least one or more spring structures.

According to an embodiment, the first spring 511 and/or the second spring 512 may move in a first direction to apply pressure to a part of the housing 110. Accordingly, the part of the housing 110 may move so that the electronic device 100 may switch from the first state 100*a* to the second state 100*b*. According to an embodiment, the first spring 511 and/or the second spring 512 may move in a second direction opposite the first direction to reduce the pressure applied to the part of the housing 110. Accordingly, the part of the housing 110 may move so that the electronic device 100 may switch from the second state 100*b* to the first state 100*a*.

According to an embodiment, the magnetic sensor 140 may be disposed on one surface of the first spring 511 or the second spring 512. According to an embodiment, the magnetic sensor 140 may move in the same direction as the movement direction of the spring 510 according to the movement of the spring 510.

According to an embodiment, in the case where the first spring 511 or the second spring 512 each includes a plurality of spring structures, it is possible to apply pressure to a part of the housing 110 using the repulsive force between the plurality of spring structures. Accordingly, as the part of the housing 110 moves, the electronic device 100 may switch from the first state 100*a* to the second state 100*b*. For example, the repulsive force between the plurality of spring structures may be generated by at least one of a magnet, an electrical signal, and a physical coupling structure.

Figure 6:
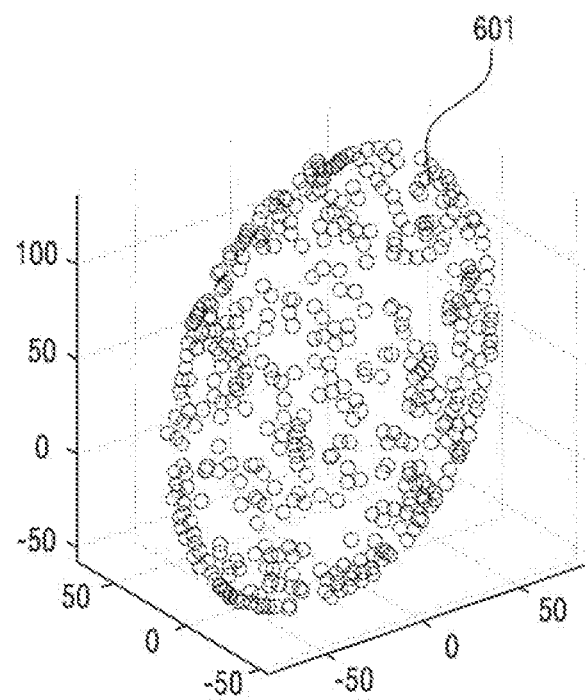
FIG. 6 illustrates distorted geomagnetic data and corrected data in an electronic device according to an embodiment.
Figure 6:
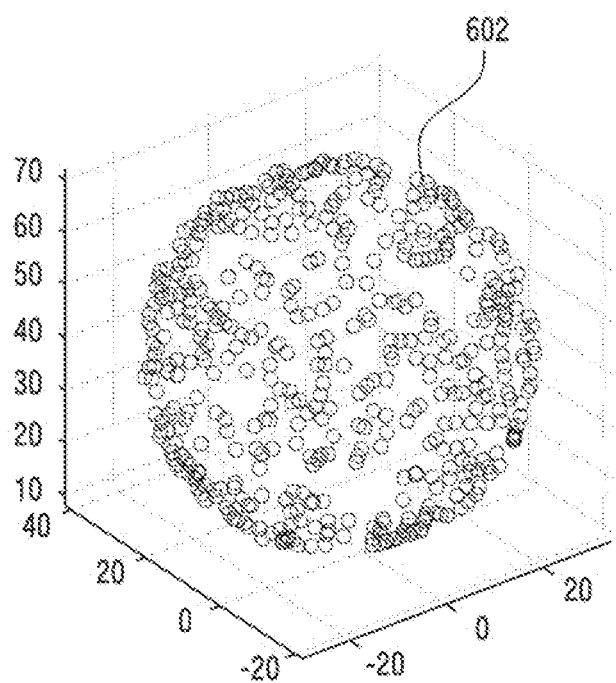

FIG. 6 illustrates distorted geomagnetic data and corrected data in an electronic device according to an embodiment.

Referring to FIGS. 2A, 2B, 3A, 3B, and 6 together, the magnetic sensor 140 may move according to the movement of the housing 110 of the electronic device 100 or 300. Geomagnetic data may be obtained while the magnetic sensor 140 is moving.

According to an embodiment, the obtained geomagnetic data may be distorted first data 601. The distorted form of the first data 601 is not limited to the illustrated ellipse and may include a partially distorted form. According to an embodiment, corrected second data 602 may be obtained by performing correction based on the obtained first data 601.

Figure 7:
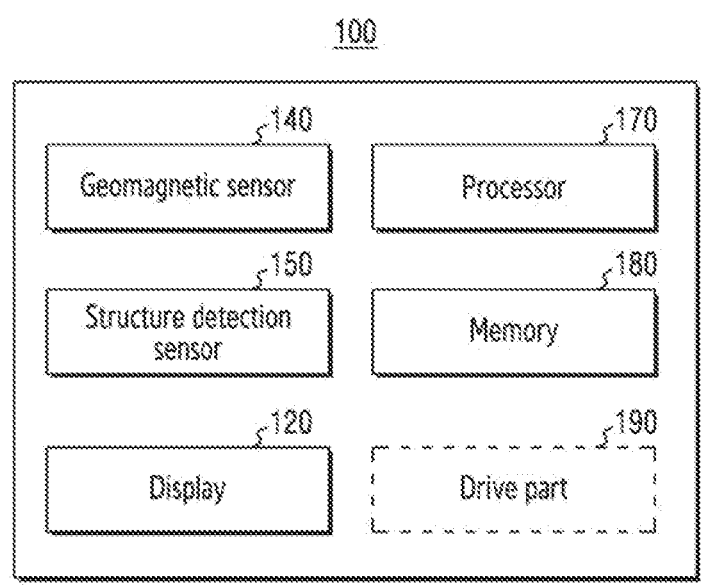
FIG. 7 is a block diagram illustrating elements provided inside an electronic device according to an embodiment.

FIG. 7 illustrates the hardware configuration of an electronic device according to an embodiment.

Referring to FIG. 7, in an embodiment, the electronic device 100 may include a processor 170 (e.g., the processor 1320 in FIG. 13), a display 120, a memory 180, a magnetic sensor 140, a structure detection sensor 150, and a drive part 190. Duplicate descriptions of the same or similar elements as those described above will be omitted. Alternatively or in addition, in FIG. 4 and other drawings, descriptions of the electronic device 100 may also be applied to the electronic device 300.

According to an embodiment, the electronic device 100 may include at least one sensor inside the housing 110. According to an embodiment, the electronic device 100 may include a structure detection sensor 150 for detecting the state of the electronic device 100. According to an embodiment, the structure detection sensor 150 may detect a change in the structure of the housing 110. In an embodiment, the structure detection sensor 150 may include at least one of the Hall sensor and a distance sensor (e.g., an optical distance sensor, an ultrasonic distance sensor, and a radio wave distance sensor).

According to an embodiment, the electronic device 100 may include at least one processor 170. At least one processor 170 may be electrically connected to the display 120, the structure detection sensor 150, and the magnetic sensor 140. According to an embodiment, at least one processor 170 may determine the state of the electronic device 100 (e.g., at least one of the first state 100*a*, the second state 100*b*, the state in which the housing 110 moves, and the moving distance of the housing 110) using the structure detection sensor 150. According to an embodiment, at least one processor 170 may obtain geomagnetic data using the magnetic sensor 140. According to an embodiment, at least one processor 170 may obtain correction data based on the obtained geomagnetic data.

For example, referring to FIGS. 2A and 2B, as the electronic device 100 switches from the first state 100*a* to the second state 100*b* or from the second state 100*b* to the first state 100*a* (e.g., during switching from the second state 100*b* to the first state 100*a*), the magnetic sensor 140 may collect geomagnetic data.

$$ax^2 + bxy + cy^2 + dx + ey + f = 0 \quad \text{[Equation 1]}$$

$$x^2 + b'xy + c'y^2 + d'x + e'y + f' = 0$$

$$\underbrace{\begin{bmatrix} x_1 y_1 & y_1^2 & x_1 & y_1 & 1 \\ \vdots & \vdots & \vdots & \vdots & \vdots \\ x_n y_n & y_n^2 & x_n & y_n & 1 \end{bmatrix}}_{J} \underbrace{\begin{bmatrix} b' \\ c' \\ d' \\ e' \\ f' \end{bmatrix}}_{X} = \underbrace{\begin{bmatrix} -x_1^2 \\ \vdots \\ -x_n^2 \end{bmatrix}}_{Y}$$

$$JX = Y$$

$$X = (J^T J)^{-1} J^T Y$$

According to an embodiment, a sphere equation (e.g., the above-described Equation 1) may be estimated using the obtained geomagnetic data. However, the equation estimated using the geomagnetic data is not limited to the sphere equation and may include an equation having a plurality of variables.

$$\theta = \frac{1}{2} \tan^{-1}\left(\frac{b}{a-c}\right) \quad \text{[Equation 2]}$$

$$c_x = \frac{2cd - be}{b^2 - 4ac}, \quad c_x = \frac{2ae - bd}{b^2 - 4ac}$$

$$w = \sqrt{\frac{ac_x^2 + bc_x c_y + cc_y^2 - f}{a\cos^2\theta + b\cos\theta\sin\theta + c\sin^2\theta}}$$

$$h = \sqrt{\frac{ac_x^2 + cc_x c_y + cc_y^2 - f}{a\sin^2\theta - b\cos\theta\sin\theta + c\cos^2\theta}}$$

According to an embodiment, distorted information (e.g., angle θ, major axis w, and minor axis h) of geomagnetic data may be calculated using the estimated sphere equation (e.g., the above-described Equation 2). According to an embodiment, correction data may be obtained according to the calculated information. In an embodiment, the electronic device 100 may include a drive part 190. The drive part 190 may include at least one motor. Referring to FIG. 3A, for example, the drive part 190 may move the second housing 112 relative to the first housing 111. In an embodiment, the electronic device 100 may expand or reduce the size of the display 120 exposed to the outside of the electronic device 100 through the drive part 190. The operation of the drive part 190 may be controlled by at least one processor 170. For example, at least one processor 170 may transmit a control signal to the motor included in the drive part 190, thereby driving the motor. Other elements (e.g., a rotating shaft and gears) of the first roller 130*a* rotate through the motor, and the second housing 112 connected to the first roller 130*a* may move. The drive part 190 may be omitted from the electronic device 100 according to another embodiment. For example, the electronic device may switch from the first state 100*a* to the second state 100*b* or from the second state 100*b* to the first state 100*a* by an external force from the user.

According to an embodiment, the electronic device 100 may include a memory 180. The memory 180 may be electrically connected to at least one processor 170 and may store geomagnetic data. The memory 180 may store correction data obtained while the electronic device 100 is switching from the first state 100*a* to the second state 100*b* or from the second state 100*b* to the first state 100*a*.

Figure 8:
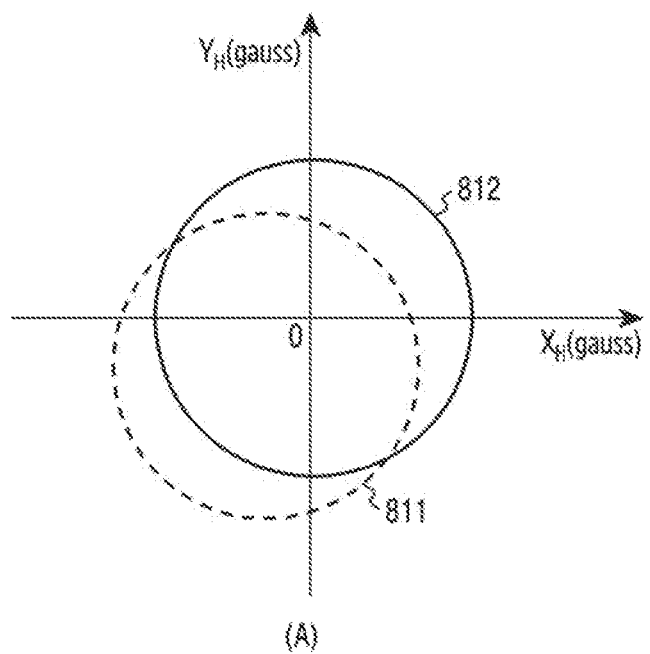
FIG. 8 illustrates distorted geomagnetic data and a result of correcting the same according to an embodiment.
Figure 8:
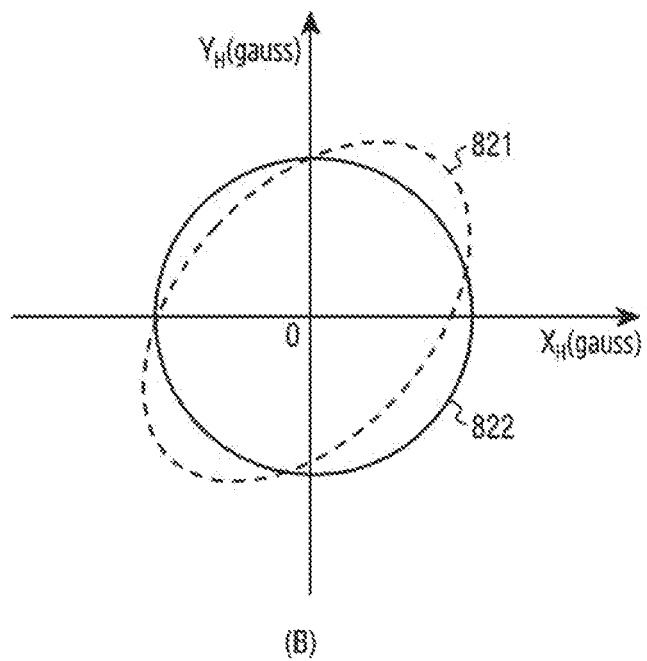

FIG. 8 illustrates distorted geomagnetic data and a result of correcting the same according to an embodiment.

At least one processor 170 according to an embodiment may obtain correction data by correcting distorted geomagnetic data. Referring to FIGS. 7 and 8 together, when the geomagnetic data is in a first distorted state 811 or a second distorted state 821, at least one processor 170 may correct the same into a first corrected state 812 or a second corrected state 822 through the spherical equation and a least squares method.

According to an embodiment, in the case where the geomagnetic data is in the first distorted state 811 in which the origin is distorted, at least one processor 170 may obtain the angle of each point or the length of the major axis or minor axis from the origin, thereby correcting the geomagnetic data into the first corrected state 812.

According to another embodiment, in the case where the geomagnetic data is in the second distortion state 821 in which the geomagnetic data is distorted into an ellipse, at least one processor 170 may obtain the length of the major axis or the minor axis from the origin, thereby correcting the geomagnetic data into the second corrected state 822. A method of correcting the geomagnetic data from the first distorted state 811 or the second distorted state 821 to the first corrected state 812 or the second corrected state 822 is not limited to the above methods.

Figure 9:
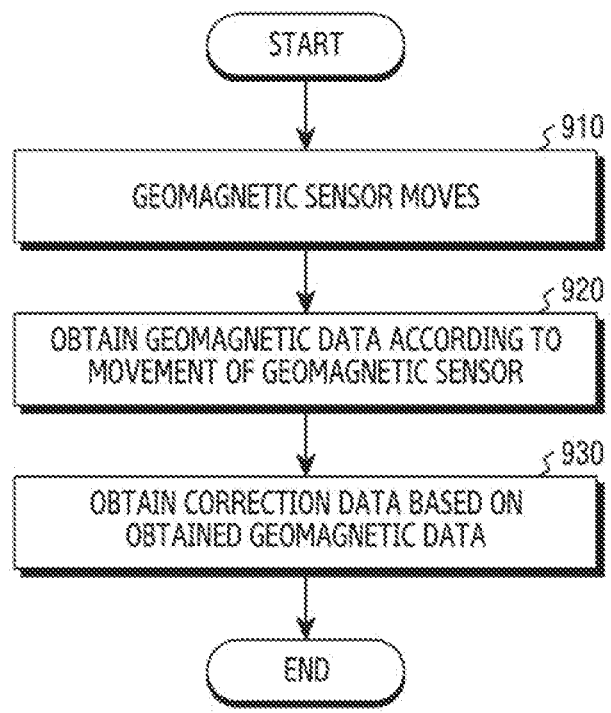
FIG. 9 is a flowchart illustrating a method of obtaining data according to movement of a magnetic sensor in an electronic device according to an embodiment.

FIG. 9 is a flowchart illustrating a method of obtaining data according to movement of a magnetic sensor in an electronic device according to an embodiment. The operation in FIG. 9 may be implemented by the electronic device 100 or 300 (or the processor 170) described with reference to FIGS. 1 to 8.

Referring to FIG. 9, the position of the magnetic sensor 140 may vary according to a change in the state of the electronic device 100 (e.g., a change from the first state 100*a* to the second state 100*b* or a change from the second state 100*b* to the first state 100*a*) in operation 910. Referring to FIGS. 2A and 2B together, as the electronic device 100 switches from the first state 100*a* to the second state 100*b*, the magnetic sensor 140 may move around the roller part 130 to change in the position. According to another embodiment, as the electronic device 100 switches from the first state 100*a* to the second state 100*b*, the magnetic sensor 140 may move in the same direction as the movement direction of the first part 121 of the display 120 so that the position may vary. If the electronic device 100 switches from the second state 100*b* to the first state 100*a*, the magnetic sensor 140 may move in a direction opposite the movement direction when the electronic device 100 switches from the second state 100*b* to the first state 100*a*.

According to an embodiment, in operation 920, at least one processor 170 may obtain geomagnetic data from the magnetic sensor 140 according to a change in the position of the magnetic sensor 140.

According to an embodiment, in operation 930, at least one processor 170 may perform correction using geomagnetic data obtained according to the position change of the magnetic sensor 140, thereby obtaining correction data. According to an embodiment, at least one processor 170 may use at least one of a least squares method and a sphere equation to obtain the correction data.

Figure 10:
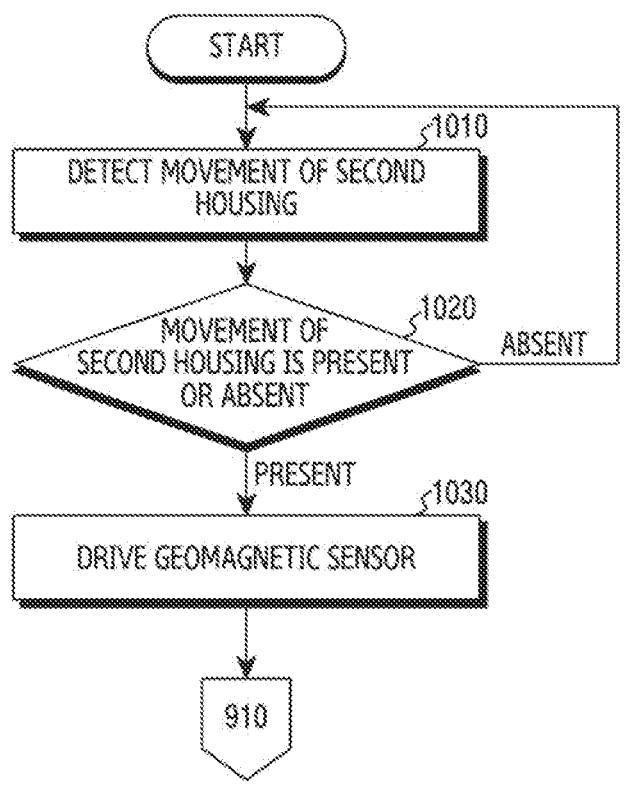
FIG. 10 is a flowchart illustrating a method of driving a magnetic sensor and obtaining data according to movement of a housing in an electronic device according to an embodiment.

FIG. 10 is a flowchart illustrating a method of driving a magnetic sensor and obtaining data according to movement of a housing in an electronic device according to an embodiment. The operation in FIG. 10 may be implemented by the electronic device 100 or 300 (or the processor 170) described with reference to FIGS. 1 to 6.

Referring to FIG. 10, the electronic device 100 may detect the movement of the second housing 112 through the structure detection sensor 150 in operation 1010. According to an embodiment, the movement of the second housing 112 may be detected through an electrical signal. According to another embodiment, the movement of the second housing 112 may be detected according to a change in the distance between the structure detection sensor 150 and the first housing 111.

According to an embodiment, in operation 1020, at least one processor 170 (e.g., the processor 1320 in FIG. 13) may receive information on whether or not the second housing 112 moves from the structure detection sensor 150 and determine whether or not the magnetic sensor 140 is driven based on the received movement information. For example, at least one processor 170 may control the structure detection sensor 150 to detect whether or not there is a movement of the second housing 112. If there is a movement of the second housing 112, at least one processor 170 may drive the magnetic sensor 140 to obtain geomagnetic data in operation 1030.

Referring to FIGS. 9 and 10 together, as the magnetic sensor 140 is driven in operation 1030, geomagnetic data may be obtained and correction data may be obtained in operations 910 to 930.

Figure 11:
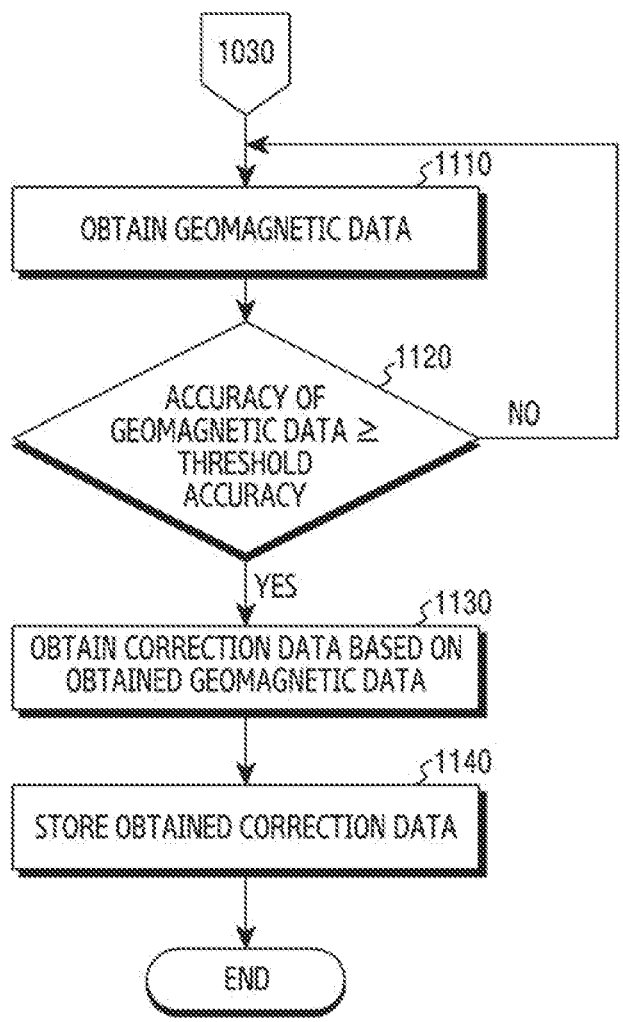
FIG. 11 is a flowchart illustrating a method of obtaining correction data by comparing a preconfigured threshold accuracy with geomagnetic data when obtaining data in an electronic device according to an embodiment.

FIG. 11 is a flowchart illustrating a method of obtaining correction data by comparing a preconfigured threshold accuracy with geomagnetic data when obtaining data in an electronic device according to an embodiment. The operation in FIG. 11 may be implemented by the electronic device 100 or 300 (or the processor 170) described with reference to FIGS. 1 to 6.

Referring to FIGS. 10 and 11 together, after driving the magnetic sensor 140 in operations 1010 to 1030, the electronic device 100 or at least one processor 170 (e.g., the processor 1320 in FIG. 13) may obtain geomagnetic data in operation 1110. According to an embodiment, in operation 1120, at least one processor 170 may determine whether the accuracy of the obtained geomagnetic data is equal to or greater than a preconfigured threshold accuracy. According to an embodiment, the accuracy of the geomagnetic data and the threshold accuracy may be determined through the amount of change in the three-dimensional vector. For example, geomagnetic data may be measured as a three-dimensional vector value. At least one processor 170 may identify a difference between the measured three-dimensional vector value and the pre-measured geomagnetic data as the accuracy of the geomagnetic data. The threshold accuracy may be stored in the memory 180 of the electronic device 100.

According to an embodiment, if the accuracy of the geomagnetic data is less than a preconfigured threshold accuracy, the geomagnetic data may be further obtained in operation 1110. According to an embodiment, in order to obtain additional geomagnetic data, the electronic device 100 may provide a guide for an additional operation to the user through the display 120.

According to an embodiment, if the accuracy of the geomagnetic data is greater than or equal to a preconfigured threshold accuracy, at least one processor 170 may obtain correction data, based on the obtained geomagnetic data, in operation 1130. According to an embodiment, the operation of obtaining the correction data may include a correction process using at least one of a least squares method and a sphere equation.

According to an embodiment, at least one processor 170 may store the obtained correction data and/or geomagnetic data in the memory 180 in operation 1140.

Figure 12A:
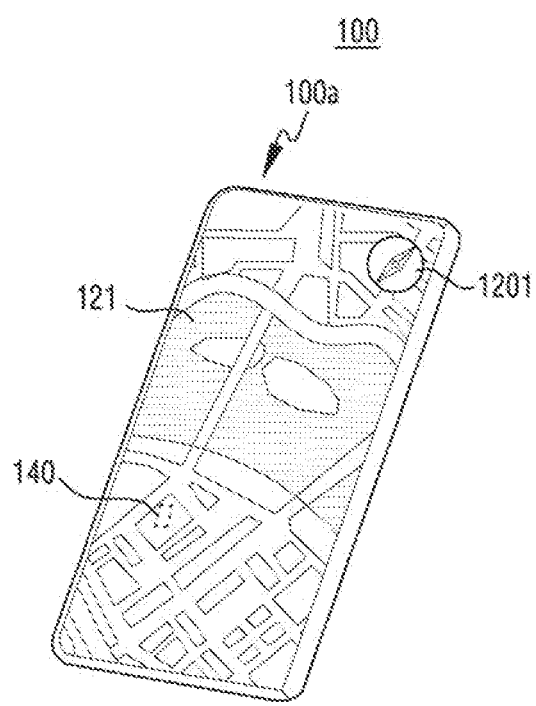
FIG. 12A illustrates an operation of displaying an interface on a display in a first state of an electronic device according to an embodiment.
Figure 12B:
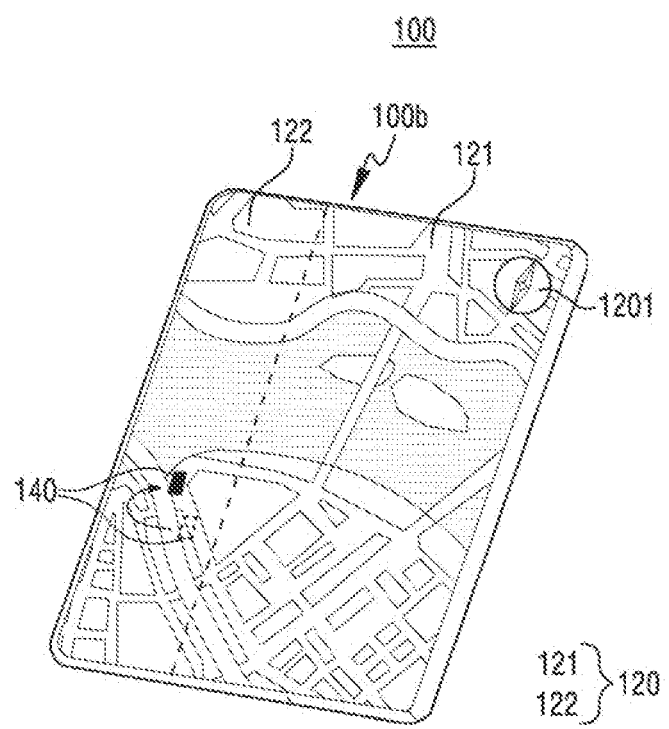
FIG. 12B illustrates an operation in which an interface displayed on a display is enlarged when an electronic device switches to a second state according to an embodiment.
Figure 12C:
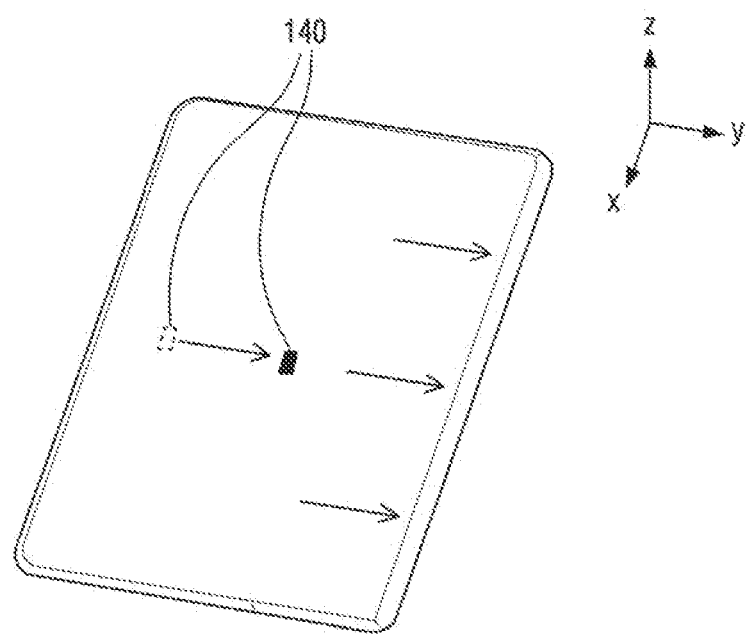
FIG. 12C illustrates a linear movement of a magnetic sensor as an electronic device switches to a second state according to an embodiment.

FIG. 12A illustrates an operation of displaying an interface on a display in a first state of an electronic device according to an embodiment. FIG. 12B illustrates an operation in which an interface displayed on a display is enlarged when an electronic device switches to a second state according to an embodiment. FIG. 12C illustrates a linear movement of a magnetic sensor as an electronic device switches to a second state according to an embodiment.

Referring to FIGS. 12A and 12B, according to an embodiment, an additional interface may be displayed on the display 120 according to the expansion of the display 120. The illustrated embodiment shows that an interface of an application providing a map changes according to the expansion of the display 120. Interfaces that are not displayed in the first state 100a may be displayed according to the expansion of the display 120. According to an embodiment, the interface of an application providing a map may include compass information 1201.

In the embodiment shown in FIG. 12A, when the display 120 is in the first state 100a, the first part 121 may be exposed through the front surface of the electronic device 100, and an interface may be displayed through the first part 121. When the display 120 is in the second state 100b, the second part 122 may also be exposed through the front surface of the electronic device 100, and an interface that is not visible in the reduced state may be displayed through the second part 122.

Referring to FIG. 7 together, if the electronic device 100 switches from the first state 100a to the second state 100b, at least one processor 170 may display an interface corrected using geomagnetic data and correction data on the display 120. According to an embodiment, at least one processor 170 may fix the interface while the electronic device 100 is switching from the first state 100a to the second state 100b and display an interface reflecting the geomagnetic data and correction data on the display 120 after the switching is completed.

According to an embodiment, while the electronic device 100 is switching from the first state 100a to the second state 100b, the magnetic sensor 140 may move around the roller part 130 to change in its position. For example, the magnetic sensor 140 may move while being turned upside down. Referring to FIG. 12C, while the electronic device 100 is switching from the first state 100a to the second state 100b, the magnetic sensor 140 may move in the y direction (e.g., the movement direction of the second housing 112) on the front part of the electronic device 100.

According to an embodiment, the compass information 1201 may be corrected and provided based on the geomagnetic data and correction data obtained while the position of the magnetic sensor 140 is changing.

Figure 13:
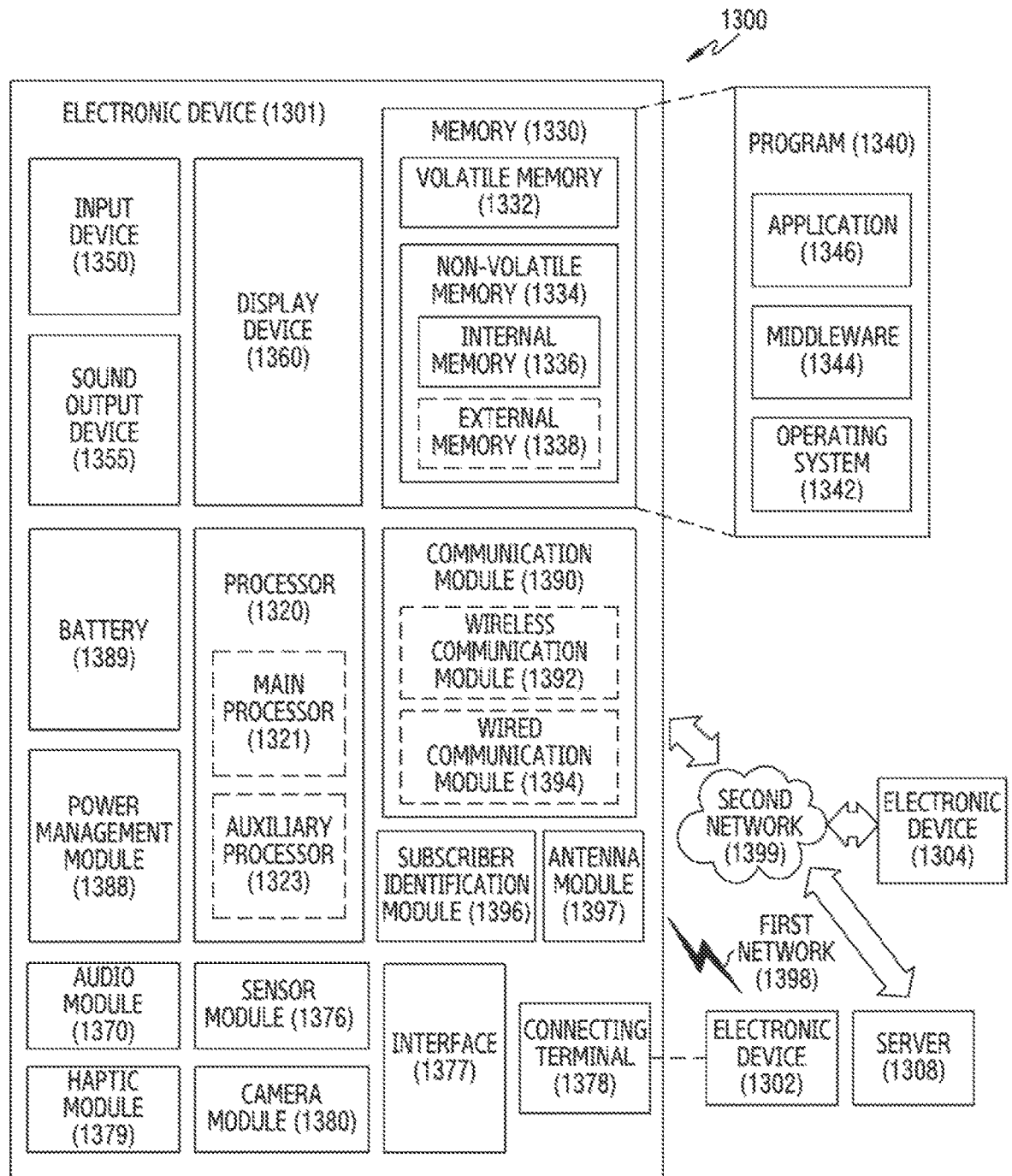
FIG. 13 is a block diagram of an electronic device in a network environment according to one or more embodiments.

FIG. 13 is a block diagram illustrating an electronic device 1301 in a network environment 1300 according to one or more embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related to the input data or the output data. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus that may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a Power Management Integrated Circuit (PMIC).

The battery 1389 may supply power to at least one component of the electronic device 1301. According to an embodiment, the battery 1389 may include, for example, a primary cell (which is not rechargeable), a secondary cell (which is rechargeable), or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a Radio Frequency Integrated Circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, General Purpose Input and Output (GPIO), Serial Peripheral Interface (SPI), or Mobile Industry Processor Interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service, automatically or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

What is claimed is:

1. An electronic device comprising:
a housing comprising a first housing and a second housing coupled to the first housing to be movable relative to the first housing;
a roller part;
a drive part connected to the roller part;
a rollable display comprising:
a first part disposed adjacent to the second housing, and
a second part surrounding the roller part and having a portion disposed inside the electronic device;
a geomagnetic sensor attached to the rollable display and disposed at a position corresponding to the second part;
a structure detection sensor configured to detect the movement of the second housing in the first state relative to the first housing; and
at least one processor configured to electrically connect to the geomagnetic sensor,
wherein:
the geomagnetic sensor is disposed at a first position in the second housing coupled with the first housing in a first state,
the geomagnetic sensor is configured to move from the first position to a second position based on a movement of the second housing in the first state relative to the first housing so that the first housing and the second housing are coupled in a second state,
the geomagnetic sensor is configured to move from the second position to the first position based on a switching from the second state to the first state, and the at least one processor is further configured to:
    obtain geomagnetic data; while a position of the geomagnetic sensor is changing, wherein the geomagnetic data is distorted first data; and
    obtain correction data by correcting the obtained geomagnetic data, wherein the correction data is second data corrected based on the distorted first data.

2. The electronic device of claim 1, wherein the at least one processor is further configured to drive the magnetic sensor in response to the detected movement of the second housing.

3. The electronic device of claim 1, wherein the drive part is configured to move the second housing through a motor operated by an electrical signal.

4. The electronic device of claim 1, wherein the drive part is configured to move the second housing through a spring.

5. The electronic device of claim 1, wherein the geomagnetic data is greater than or equal to a configured threshold value.

6. The electronic device of claim 5, wherein the configured threshold value is an amount of change in a three-dimensional vector of the geomagnetic data.

7. The electronic device of claim 1, wherein the electronic device further comprises an interface displayed on the rollable display by utilizing the correction data according to a user's input.

8. A method of correcting geomagnetic data of an electronic device having a rollable display, a geomagnetic sensor attached to the rollable display, and structure detection sensor, the method comprising:
    obtaining geomagnetic data from the geomagnetic sensor based on a movement of the second housing relative to the first housing, the movement of the second housing changing an area where the rollable display is exposed to an outside of the electronic device and a position of the geomagnetic sensor, wherein the geomagnetic data is distorted first data;
    detecting the movement of the second housing relative to the first housing;
    activating the magnetic sensor in response to the detection;
    obtaining correction data by correcting the obtained geomagnetic data, wherein the corrected data is second data corrected based on the distorted first data.

9. The method of claim 8, wherein the detecting is performed by a structure detection sensor of the electronic device.

10. The method of claim 8, wherein the detecting is performed by an optical distance sensor.

11. The method of claim 8, wherein the obtaining of the geomagnetic data comprises determining whether the obtained geomagnetic data is greater than or equal to a configured threshold value.

12. The method of claim 11, further comprising obtaining the correction data based on the geomagnetic data that is greater than or equal to a configured threshold value.

13. The method of claim 8, further comprising storing the correction data in a memory of the electronic device.

* * * * *